US009772647B2

(12) United States Patent
Bienvenu

(10) Patent No.: US 9,772,647 B2
(45) Date of Patent: *Sep. 26, 2017

(54) POWERING OF A CHARGE WITH A FLOATING NODE

(71) Applicant: STMicroelectronics (Rousset) SAS, Rousset (FR)

(72) Inventor: Philippe Bienvenu, Saint Maximin la Sainte Baume (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 30 days.

This patent is subject to a terminal disclaimer.

(21) Appl. No.: 14/975,519

(22) Filed: Dec. 18, 2015

(65) Prior Publication Data

US 2016/0103464 A1    Apr. 14, 2016

Related U.S. Application Data

(63) Continuation of application No. 13/960,224, filed on Aug. 6, 2013, now Pat. No. 9,218,009.

(30) Foreign Application Priority Data

Aug. 23, 2012   (FR) ..................................... 12 57951

(51) Int. Cl.
*G05F 3/18*    (2006.01)
*G05F 3/26*    (2006.01)
*G05F 1/10*    (2006.01)
*H02M 3/07*    (2006.01)

(52) U.S. Cl.
CPC ................ *G05F 3/262* (2013.01); *G05F 1/10* (2013.01); *G05F 3/18* (2013.01); *H02M 3/07* (2013.01)

(58) Field of Classification Search
CPC ..... G05F 1/10; G05F 3/02; G05F 3/08; G05F 3/18; G05F 3/262; H02M 3/07; H02M 3/0073; H02M 3/158; H02M 7/10; H02M 7/19; H02M 7/25
See application file for complete search history.

(56) References Cited

U.S. PATENT DOCUMENTS

| 5,585,991 | A |   | 12/1996 | Williams |
| 5,642,072 | A |   | 6/1997 | Miyamoto et al. |
| 5,689,208 | A |   | 11/1997 | Nadd |
| 6,078,168 | A | * | 6/2000 | Paolo ...................... G05F 3/225 323/226 |

(Continued)

FOREIGN PATENT DOCUMENTS

| CN | 203444383 U | 2/2014 |
| EP | 0800131 A1 | 10/1997 |
| WO | 2006023145 A2 | 3/2006 |

*Primary Examiner* — Gary L Laxton
(74) *Attorney, Agent, or Firm* — Slater Matsil, LLP

(57) ABSTRACT

A circuit includes a current source series-connected with a load between first and second terminals and an element coupled in parallel with the load between the first and second terminals. A value of a current in the current source is controlled based on a current flowing in the element between the first and second terminals. The value of the current in the current source is controlled proportional to power consumption in the load based on the current flowing in the element between the first and second terminals. The element is used to limit a voltage across the load while the value of the current is being controlled.

20 Claims, 2 Drawing Sheets

(56) References Cited

U.S. PATENT DOCUMENTS

| | | |
|---|---|---|
| 6,501,254 B2 | 12/2002 | Spalding, Jr. |
| 6,917,187 B2 | 7/2005 | Okubo et al. |
| 7,038,430 B2 | 5/2006 | Itabashi et al. |
| 7,462,995 B2 | 12/2008 | Hamidian et al. |
| 8,710,813 B2 * | 4/2014 | Yang ................ G05F 1/575 323/274 |
| 9,218,009 B2 * | 12/2015 | Bienvenu ............ G05F 3/262 |
| 2008/0143309 A1 | 6/2008 | Odell et al. |
| 2011/0043140 A1 | 2/2011 | Shiu |
| 2011/0057633 A1 | 3/2011 | Tanabe |
| 2014/0055119 A1 | 2/2014 | Bienvenu |

\* cited by examiner

POWERING OF A CHARGE WITH A FLOATING NODE

This application is a continuation of U.S. patent application Ser. No. 13/960,224, filed Aug. 6, 2013 and now U.S. Pat. No. 9,218,009, which claims priority to French Patent Application No. 1257951, filed Aug. 23, 2012. All of these applications are incorporated herein by reference.

TECHNICAL FIELD

The present disclosure relates to electronic circuits and, in specific embodiments, to circuits for powering a load from a D.C. voltage capable of varying.

BACKGROUND

When a load is to be powered under a fixed D.C. voltage, a voltage-setting element, typically a zener diode connected in parallel with the load, is often used. A current source is then series-connected with this parallel association and the assembly is powered with a D.C. voltage. The zener diode has the function of limiting (setting) the voltage across the load. The current source has the function of absorbing the current flowing through the load and through the zener diode.

For a fixed load (constant power consumption), the current source is sized according to this current to guarantee that the zener diode is permanently in avalanche (active as a voltage limiter).

However, for a load having a power consumption which is capable of varying, the current source must then be sized according to the maximum power consumption of the load. This generates an unnecessary power consumption when the load does not draw this maximum current.

SUMMARY OF THE INVENTION

An embodiment overcomes all or part of the disadvantages of usual circuits for powering a load.

Another embodiment optimizes the power consumption of the power supply circuit and, more specifically to decrease its losses.

An embodiment provides a solution requiring no modification of the load to be powered.

Thus, an embodiment provides a circuit that includes a current source intended to be series-connected with a load between two terminals of application of a first D.C. voltage. An element limits the voltage across the load. A circuit controls the value of the current in the current source with the current flowing in the element.

According to an embodiment, the control circuit comprises a first MOS transistor, assembled as a diode and as a current mirror on a second MOS transistor. The second transistor is in series with a third transistor between the terminals of application of the power supply voltage. The third transistor is assembled as a diode and as a current mirror on a fourth transistor connected to a control terminal of the current source.

According to an embodiment, the element is a zener diode connected to the junction point of the load and of the current source.

According to an embodiment, the zener diode is in series with the first transistor.

According to an embodiment, the element is internal to the load and controls the first transistor.

According to an embodiment, the fourth transistor is in series with a resistive element between two terminals of application of a second D.C. voltage.

According to an embodiment, the current source is formed of a MOS transistor.

According to an embodiment, the load is a charge pump circuit.

The foregoing and other features and advantages will be discussed in detail in the following non-limiting description of specific embodiments in connection with the accompanying drawings. dr

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

Figure 1:
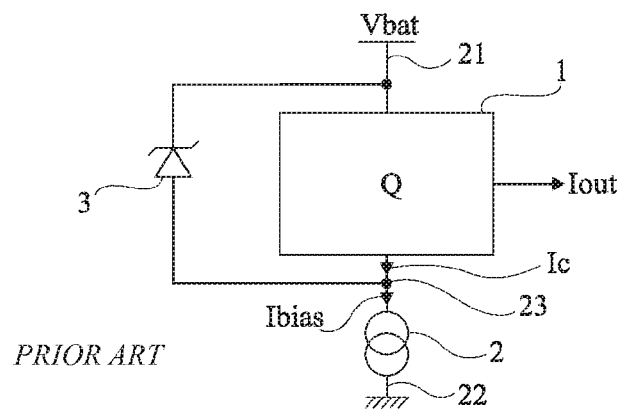
FIG. 1 schematically shows a usual example of a circuit for powering a load.

The same elements have been designated with the same reference numerals in the different drawings. For clarity, only those elements which are useful to the understanding of the described embodiments have been shown and will be detailed. In particular, such embodiments are compatible with any type of load intended to be in series with a current source.

An example of application of the embodiments which will be described aims at a load formed of a charge pump or charge transfer circuit. In such a circuit, the power consumption varies according to that of the element(s) powered by the charge pump.

Similar problems more generally arise as soon as a load is to be powered from a voltage capable of varying and as its power supply voltage is desired to be set by means of a zener diode or the like. Actually, the load then is in series with a current source, which creates a node at a floating potential. For example, this may be amplification or comparison circuits referenced to a potential other than ground.

FIG. 1 shows a usual example of a circuit for powering a load 1 (Q) with a D.C. voltage (for example, a voltage Vbat delivered by a battery) and having a variable power consumption. The circuit to be powered (i.e., load 1) is series-connected with a constant current source 2 between two terminals 21 and 22 of connection to the source (battery) providing the D.C. voltage. A zener diode 3 or the like is connected in parallel with load 1. The zener diode 3 has a anode on the side of junction point 23 of the load and of current source 2.

The operating principle is the following. The current source is usually sized to sample a constant current Ibias to ensure an operation of the load according to its different power consumptions. In the example of FIG. 1, this consumption depends on current Iout, which may be provided by load 1. Current Ibias is selected to be greater than the maximum value of current Ic capable of being drawn by load 1, to ensure a proper biasing of zener diode 3. In the opposite case, zener diode 3 blocks the power supply voltage across load 1, set by the threshold voltage of the zener diode, drops.

Such a circuit is more specifically intended for applications in which D.C. voltage Vbat risks varying and where the load must be powered with an approximately constant voltage. This justifies the use of a zener diode 3 or another component for setting a voltage threshold.

A problem with a circuit of the type in FIG. 1 is that the general power consumption is independent from the power consumption of load 1. Indeed, constant current source 2 must be sized with respect to the worst case of load power consumption. This results in a maximum permanent power consumption, even when the load does not need it, the excess current being then deviated by the zener diode.

Figure 2:
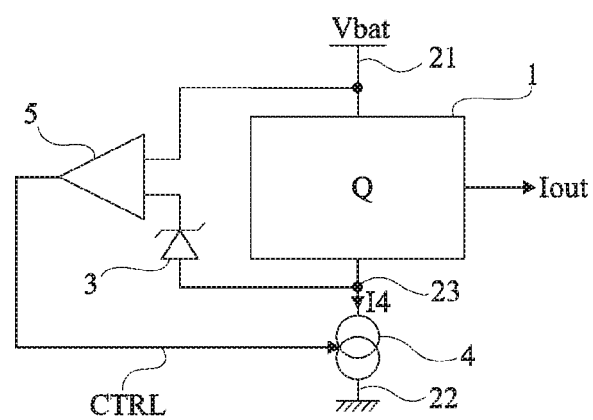
FIG. 2 is a functional block diagram of an embodiment of a circuit for powering a load.

FIG. 2 is a functional diagram of an embodiment of a circuit for powering a load 1. As previously, load 1 is series-connected with a current source 4 between two terminals 21 and 22 of application of a D.C. voltage Vbat. However, current source 4 here is an adjustable current source. The value of current 14 in current source 4 depends on a control signal CTRL provided by a circuit 5, which compares the voltage at node 21 with the voltage at node 23 plus the threshold voltage of zener diode 3. In other words, comparator 5 detects a variation of the voltage across load 1 with respect to the voltage set by diode 3.

The aim 1s to adjust the value of the current drawn by current source 4 to the load power consumption.

It could have been devised to use a measurement of current Tout provided by the load, or a direct measurement of the current in load 1 to assess its power consumption and adjust the value of the currents source. However, this would require modifying the actual load circuit. Further, sampling data from the current consumed by the load at the load level may influence its behavior.

Thus, as illustrated in FIG. 2, it is provided to control the current in current source 4 with the current flowing through zener diode 3. Indeed, if the load power consumption decreases, the current in the branch of the zener diode tends to increase, and conversely.

Figure 3:
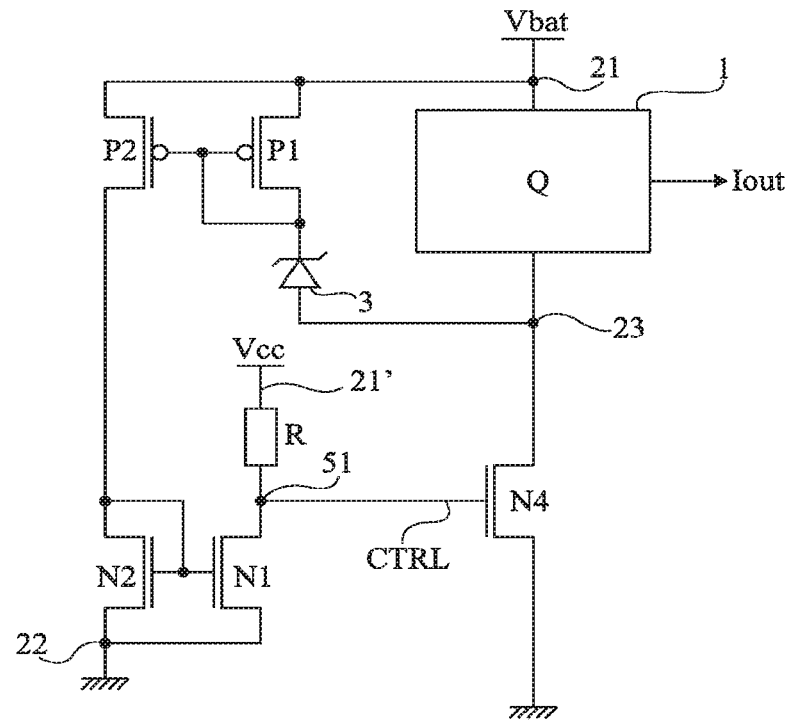
FIG. 3 shows the electric diagram of an embodiment of a circuit for powering a load at floating potential.

FIG. 3 shows an electric diagram of an embodiment of a power circuit such as shown in FIG. 2.

A MOS transistor P1, here with a P channel, assembled as a diode, is interposed between the cathode of zener diode 3 and terminal 21. Transistor P1 is assembled as a current mirror on a P-channel MOS transistor P2 series-connected with an N-channel MOS transistor N2 between terminals 21 and 22. Transistor N2 is assembled as a diode and as a mirror on an N-channel MOS transistor N1. Transistor N1 is in series with a current-to-voltage conversion resistive element R between a terminal 21' of application of a D.C. voltage (Vcc) and ground 22. Voltage Vcc applied to terminal 21' is not necessarily identical to the voltage applied to terminal 21. In practice, it generally is a lower voltage. Junction point 51 of resistor R and transistor N1 is connected to the gate of an N-channel MOS transistor N4 forming current source 4.

Assuming that the load power consumption increases, the current in transistor P1, and thus in zener diode 3, tends to decrease. The current decrease, reproduced in transistor P2, and then in transistor N1 (current mirror N1, N2), functionally amounts to modifying the value of the resistive bridge formed of element R and of the on-state resistance of transistor N1. This results in an increase of the voltage at node 51, whereby the current drawn by transistor N4 increases.

Conversely, if the load power consumption decreases, the current increase in transistor P1 reflects on the current in transistor N1, which causes a decrease of voltage CTRL of the gate of transistor N4, whereby the current drawn by transistor N4 decreases.

In the sizing of the circuit of FIG. 3, the fact that the power supply voltage of load 1 is now set by the threshold voltage of the zener diode, plus the threshold voltage of diode-assembled transistor P1, will of course be taken into account.

An advantage of the discussed embodiment is that it optimizes the power consumption of current source 4 enabling to power load 1.

Another advantage is that the regulation requires no direct measurement of the load power consumption, or of output current Tout of this load. The implementation of the described embodiments thus requires no modification of load 1 to be powered.

As a specific embodiment, voltage Vbat is a voltage of a few tens of volts. Load 1 is a charge pump circuit intended to power application circuits. Voltage Vcc is on the order of a few volts.

Figure 4:
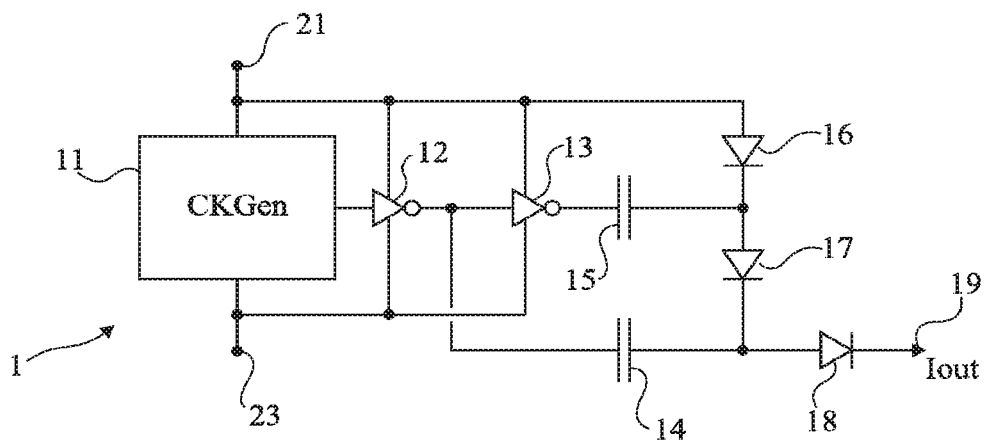
FIG. 4 shows an example of a load at a floating potential.

FIG. 4 illustrates an example of a charge pump circuit capable of forming load 1 of the circuit of FIGS. 2 and 3. Such a circuit is usual per se.

A clock generator 11 (CK Gen) is powered between terminals 21 and 23 and provides an input signal of a first inverter 12 in series with a second inverter 13. Inverters 12 and 13 are powered between terminals 21 and 23. The outputs of inverters 12 and 13 are each connected to a first electrode of a capacitive elements 14 and 15, respectively. Three diodes 16, 17, and 18 are series-connected between terminal 21 and a terminal 19 providing current Tout. Finally, the second respective electrodes of capacitors 14 and 15 are connected between diodes 16 and 17, respectively between diodes 17 and 18. The operation of such a circuit is known.

Various embodiments have been described. Various alterations, modifications, and improvements will occur to those skilled in the art. In particular, although the embodiments have been described in relation with a load 1 connected on the positive voltage side, the described circuit easily transposes to a load in series with a current source, the current source being on the positive voltage side. Further, although embodiments where the current limitation in the load is ensured by an external limiting element connected thereacross, a voltage reference (for example, internal to the load) may also be used to control the gate of transistor P1. Such a variation is particularly intended for the case where the load has such a voltage reference. Finally, the sizing of the circuit components is within the abilities of those skilled in the art based on the functional indications provided hereabove, on the maximum expected power consumption of the load, and by using electronic circuit sizing tools which are usual per se.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description.

It is therefore intended that the appended claims encompass any such modifications or embodiments.

What is claimed is:

1. A method of operating a circuit that includes a current source that is series-connected with a load between first and second terminals and also includes an element coupled in parallel with the load between the first and second terminals, the method comprising:
controlling a value of a current in the current source based on a current flowing in the element between the first and second terminals, wherein the value of the current in the current source is controlled proportional to a power consumption in the load based on the current flowing in the element between the first and second terminals; and
while controlling the value of the current, using the element to limit a voltage across the load.

2. The method of claim 1, wherein the element comprises a Zener diode.

3. The method of claim 2, wherein the element further comprises a diode-coupled transistor coupled in series with the Zener diode.

4. The method of claim 1, wherein the first terminal comprises a battery terminal and the second terminal comprises a ground terminal.

5. The method of claim 1, wherein the element is connected to a junction point between the load and the current source.

6. The method of claim 1, wherein the value of the current is controlled using a control circuit that comprises a first MOS transistor assembled as a diode and as a current mirror on a second MOS transistor, the second MOS transistor being in series with a third transistor between the first terminal and the second terminal and the third transistor being assembled as a diode and as a current mirror on a fourth transistor connected to a control terminal of the current source.

7. The method of claim 6, wherein the element is internal to the load and controls the first MOS transistor.

8. The method of claim 1, wherein the current source comprises a MOS transistor.

9. A method comprising:
controlling a value of a current flowing through a load at a first time when the load has a power consumption of a first magnitude, the controlling limiting a voltage across a first terminal and a second terminal, wherein the load is coupled between the first terminal and the second terminal; and
adjusting the value of the current flowing through the load at a second time when the load has a power consumption of a second magnitude that is different than the first magnitude, wherein the value of the current flowing through the load is adjusted proportional to power consumption in the load based so that the value of the current flowing through the load changes as the power consumption in the load changes.

10. The method of claim 9, wherein adjusting the value of the current through the load comprises comparing a voltage of adjusting the current through the load with an output of a comparator, the comparator having a first input coupled to the first terminal and a second input coupled to the second terminal via a diode.

11. The method of 9, wherein adjusting the value of the current through the load comprises controlling the value of the current through the load proportional to the power consumption in the load based on the current flowing in an element coupled between the first terminal and the second terminal.

12. The method of claim 9, wherein controlling the value of the current flowing through the load comprises causing the current to flow using a current source coupled in series with the load between the first terminal and the second terminal.

13. The method of claim 12, wherein adjusting the value of the current through the load comprises controlling the value of the current through the load proportional to the power consumption in the load based on current flowing in an element coupled between the first terminal and the second terminal, the element being connected to a junction point between the load and the current source.

14. The method of claim 12, wherein the value of the current is controlled and adjusted using a control circuit that comprises a first MOS transistor assembled as a diode and as a current mirror on a second MOS transistor, the second MOS transistor being in series with a third transistor between the first terminal and the second terminal and the third transistor being assembled as a diode and as a current mirror on a fourth transistor connected to a control terminal of the current source.

15. A method comprising:
causing a current to flow through a load coupled between a first reference voltage terminal and a second reference voltage terminal; and
controlling a value of the current flowing through the load based on a current flowing in a diode coupled between the first reference voltage terminal and the second reference voltage terminal, wherein the value of the current flowing through the load is controlled proportional to power consumption in the load based on the current flowing in the diode so that the value of the current flowing through the load is adjusted when a power consumption in the load changes.

16. The method of claim 15, wherein the diode limits a voltage across the first reference voltage terminal and the second reference voltage terminal.

17. The method of claim 15, wherein the first reference voltage terminal comprises a battery terminal and the second reference voltage terminal comprises a ground terminal.

18. The method of claim 15, wherein the diode is internal to the load.

19. The method of claim 15, wherein the diode comprises a Zener diode connected to a junction point between the load and a variable current source used to cause the current to flow through the load.

20. The method of claim 19, wherein the variable current source comprises a transistor with a current path coupled in series with the load between the first reference voltage terminal and the second reference voltage terminal and a control terminal coupled to a control output of a control circuit.

* * * * *